US012536635B2

(12) United States Patent
Inoue et al.

(10) Patent No.: US 12,536,635 B2
(45) Date of Patent: Jan. 27, 2026

(54) GRASPING DEVICE

(71) Applicant: NEC Corporation, Tokyo (JP)

(72) Inventors: Keiko Inoue, Tokyo (JP); Shoji Yachida, Tokyo (JP); Toshinori Hosoi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 649 days.

(21) Appl. No.: 17/918,158

(22) PCT Filed: Apr. 20, 2020

(86) PCT No.: PCT/JP2020/017030
§ 371 (c)(1),
(2) Date: Oct. 11, 2022

(87) PCT Pub. No.: WO2021/214820
PCT Pub. Date: Oct. 28, 2021

(65) Prior Publication Data
US 2023/0137636 A1 May 4, 2023

(51) Int. Cl.
*G06T 7/00* (2017.01)
*G06T 7/20* (2017.01)
*B25J 17/02* (2006.01)

(52) U.S. Cl.
CPC .............. *G06T 7/0002* (2013.01); *G06T 7/20* (2013.01); *B25J 17/0241* (2013.01); *G06T 2207/30204* (2013.01)

(58) Field of Classification Search
CPC .............. G06T 7/0002; G06T 7/20; G06T 2207/30204; B25J 17/0241; G01N 21/9009; G01N 21/9027

USPC ........................................................ 382/103
See application file for complete search history.

(56) References Cited

U.S. PATENT DOCUMENTS

| 5,864,395 A | 1/1999 | Laurberg |
| 2009/0279082 A1 | 11/2009 | Till et al. |
| 2010/0220919 A1 | 9/2010 | Leclerc et al. |
| 2013/0242085 A1* | 9/2013 | Gut ...................... G01N 21/958 348/127 |
| 2014/0319356 A1 | 10/2014 | Sartorius et al. |
| 2015/0142171 A1* | 5/2015 | Li ........................ B25J 9/1692 700/251 |

(Continued)

FOREIGN PATENT DOCUMENTS

| CN | 109709108 A | * 5/2019 | |
| JP | 2002214153 A | * 7/2002 | ......... G01N 21/9027 |
| JP | 2003098107 A | * 4/2003 | |

(Continued)

OTHER PUBLICATIONS

International Search Report for PCT Application No. PCT/JP2020/017030, mailed on Jul. 21, 2020.

(Continued)

*Primary Examiner* — Neil R Mclean
(74) *Attorney, Agent, or Firm* — Sughrue Mion, PLLC

(57) ABSTRACT

A grasping device includes: a grasping unit configured to grasp a container filled with liquid; a tilting unit configured to at least tilt the container in a state where the grasping unit grasps the container; and a maker installed at a part tilting in synchronism with the container when the container tilts and configured to move in conjunction with movement of the container.

12 Claims, 15 Drawing Sheets

(56) References Cited

U.S. PATENT DOCUMENTS

2020/0110042 A1* 4/2020 Bonardi ............. G01N 21/9027
2021/0213486 A1* 7/2021 Fradkin ................ G06V 10/764

FOREIGN PATENT DOCUMENTS

| | | |
|---|---|---|
| JP | 2003-130805 A | 5/2003 |
| JP | 2004-354100 A | 12/2004 |
| JP | 2010-61844 A | 3/2010 |
| JP | 2010-507807 A | 3/2010 |
| JP | 2010-261844 A | 11/2010 |
| JP | 2013-096921 A | 5/2013 |
| JP | 2013-096922 A | 5/2013 |
| WO | 2005/031328 A1 | 4/2005 |

OTHER PUBLICATIONS

Extended European Search Report for EP Application No. 20932802.0, dated on May 4, 2023.
Communication dated Jul. 11, 2023 issued by the Japanese Patent Office for JP Patent Application No. 2022-516476.

* cited by examiner

GRASPING DEVICE

This application is a National Stage Entry of PCT/JP2020/017030 filed on Apr. 20, 2020, the contents of all of which are incorporated herein by reference, in their entirety.

TECHNICAL FIELD

The present invention relates to a grasping device, a determination system, a determination apparatus, a determination method, and a recording medium.

BACKGROUND ART

A technique for detecting foreign matter in liquid in a container is known.

One of the techniques used in detecting foreign matter is described in Patent Document 1, for example. Patent Document 1 describes a system which includes a reversing device, an imaging device, and an image processing device. According to Patent Document 1, the reversing device tilts or inverts a held object to be inspected and returns the object to its original posture. The imaging device captures an image of the object to be inspected immediately after being tilted or inverted and returned to its original posture by the reversing device. The image processing device processes the image captured by the imaging device and determines whether the object to be inspected is good or bad. Patent Document 1 discloses tilting or inverting an object to be inspected around a rotation center axis located above the object to be inspected.

Further, a related technique is described in Patent Document 2, for example. Patent Document 2 describes a method to detect foreign matter by selecting an air bubble and a stain and the like on a container based on a difference image and removing the selected air bubble and stain and the like.

Patent Document 1: International Publication No. WO 2005-031328
Patent Document 2: Japanese Unexamined Patent Application Publication No. JP-A 2004-354100

In detecting foreign matter with accuracy, it is required to distinguish foreign matter from an air bubble and a scratch, a stain and the like attaching to a container. However, unlike foreign matter, an air bubble and the like, a scratch, a stain and the like attaching to a container do not move in a state where the container is stationary. Therefore, with the techniques described in Patent Document 1 and Patent Document 2, which are performing detection based on the result of imaging a container in a stationary state, it may be difficult to distinguish a scratch, a stain and the like attaching to the container.

SUMMARY

Accordingly, an object of the present invention is to provide a grasping device, a determination system, a determination apparatus, a determination method, and a recording medium that make it possible to easily determine a scratch, a stain and the like attaching to a container in detecting foreign matter.

In order to achieve the object, a grasping device as an aspect of the present disclosure includes: a grasping unit configured to grasp a container filled with liquid; a tilting unit configured to at least tilt the container in a state where the grasping unit grasps the container; and a maker installed at a part tilting in synchronism with the container when the container tilts and configured to move in conjunction with movement of the container.

Further, a determination system as another aspect of the present disclosure includes: a grasping device including a grasping unit configured to grasp a container filled with liquid, a tilting unit configured to at least tilt the container in a state where the grasping unit grasps the container, and a maker installed at a part tilting in synchronism with the container when the container tilts and configured to move in conjunction with movement of the container; a camera installed outside the grasping device and configured to image the liquid filled in the container; and a determination apparatus configured to detect an object based on image data obtained by the camera and determine whether or not the detected object is foreign matter.

Further, a determination apparatus as another aspect of the present disclosure includes: a detection unit configured to detect an object based on image data showing liquid filled in a container and a marker moving in conjunction when the container moves; a tracking unit configured to track the object detected by the detection unit; and a determination unit configured to perform determination of the object detected by the detection unit based on a result of tracking by the tracking unit and movement of the marker.

Further, a determination method as another aspect of the present disclosure includes, by a determination apparatus: detecting an object based on image data showing liquid filled in a container and a marker moving in conjunction when the container moves; tracking the detected object; and performing determination of the detected object based on a result of tracking and movement of the marker.

Further, a recording medium as another aspect of the present disclosure is a non-transitory computer-readable recording medium having a program recorded thereon. The program includes instructions for causing a determination apparatus to implement: a detection unit configured to detect an object based on image data showing liquid filled in a container and a marker moving in conjunction when the container moves; a tracking unit configured to track the object detected by the detection unit; and a determination unit configured to perform determination of the object based on a result of tracking by the tracking unit and movement of the marker.

With the respective configurations as described above, it is possible to provide a grasping device, a determination system, a determination apparatus, a determination method, and a recording medium that make it possible to easily determine a scratch, a stain and the like attaching to a container in detecting foreign matter.

EXAMPLE EMBODIMENTS

First Example Embodiment

Figure 1:
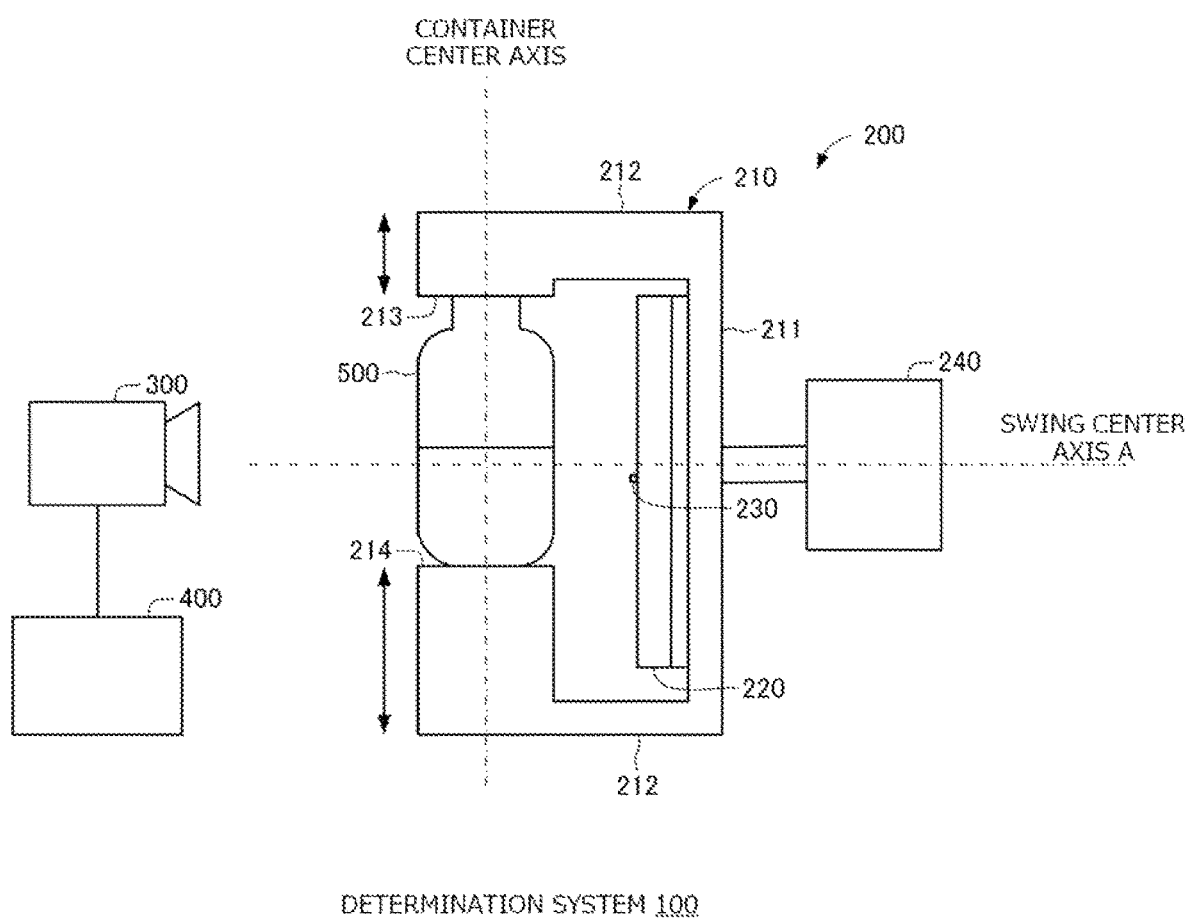
FIG. 1 is a view showing an example of a configuration of a determination system in a first example embodiment of the present disclosure.
Figure 2:
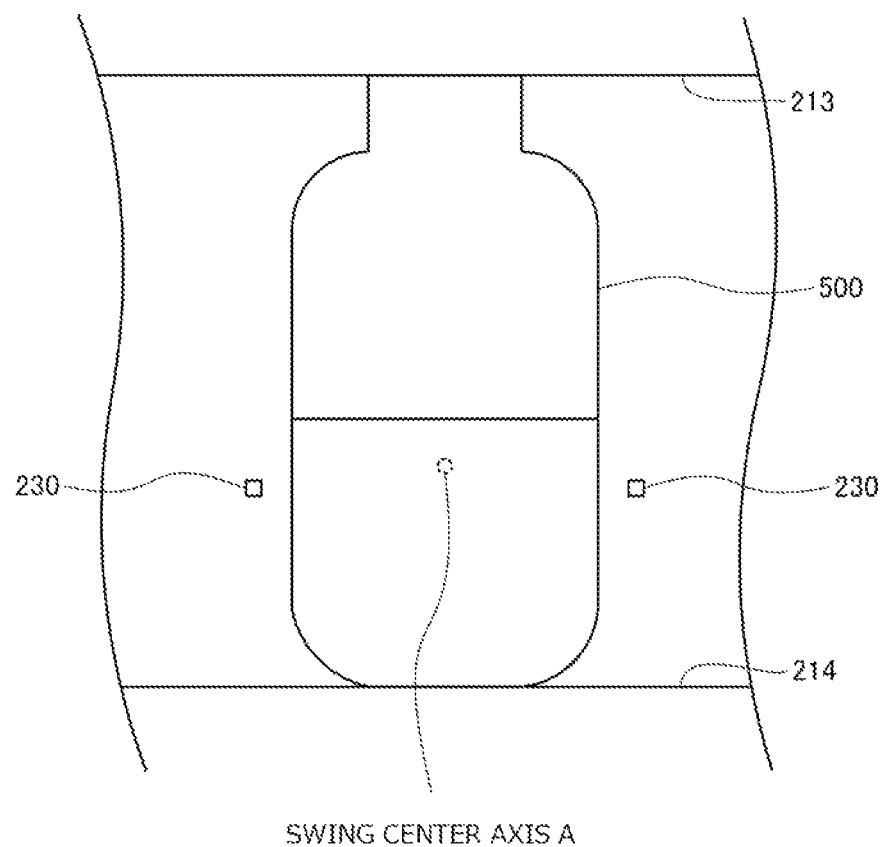
FIG. 2 is a view showing an example of a positional relation between a container and a marker.
Figure 3:
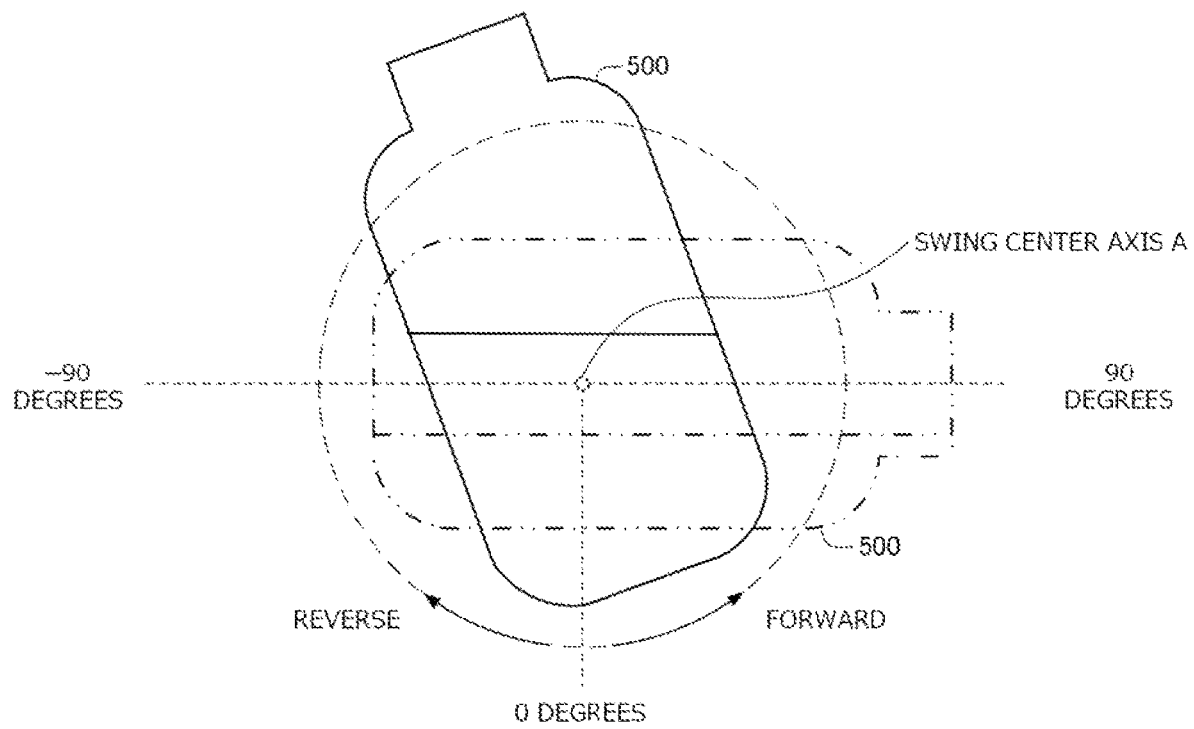
FIG. 3 is a view for describing an example of movement of the container.
Figure 4:
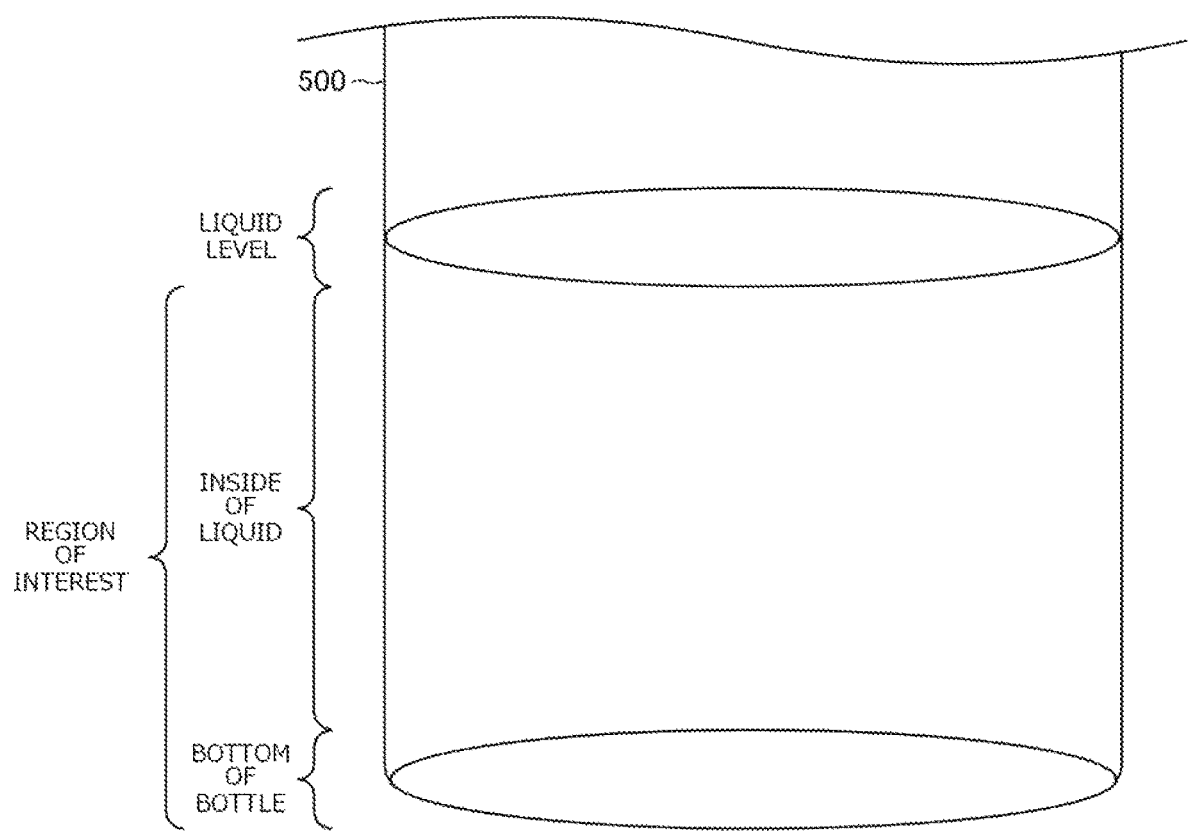
FIG. 4 is a view for describing a region of interest.
Figure 5:
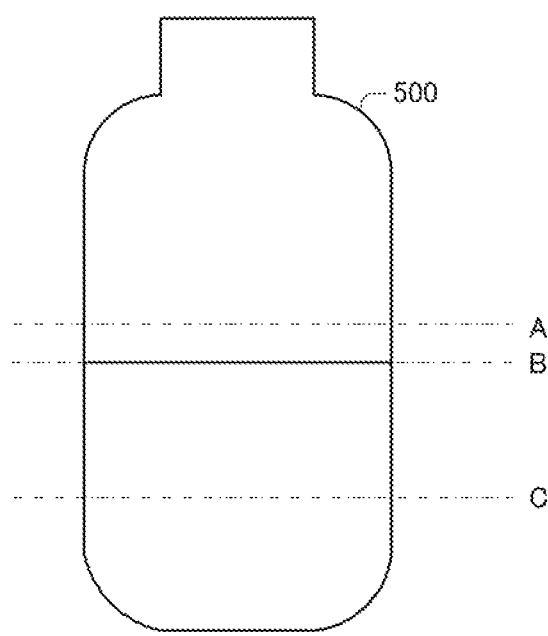
FIG. 5 is a view for describing a position of a swing center axis.
Figure 6:
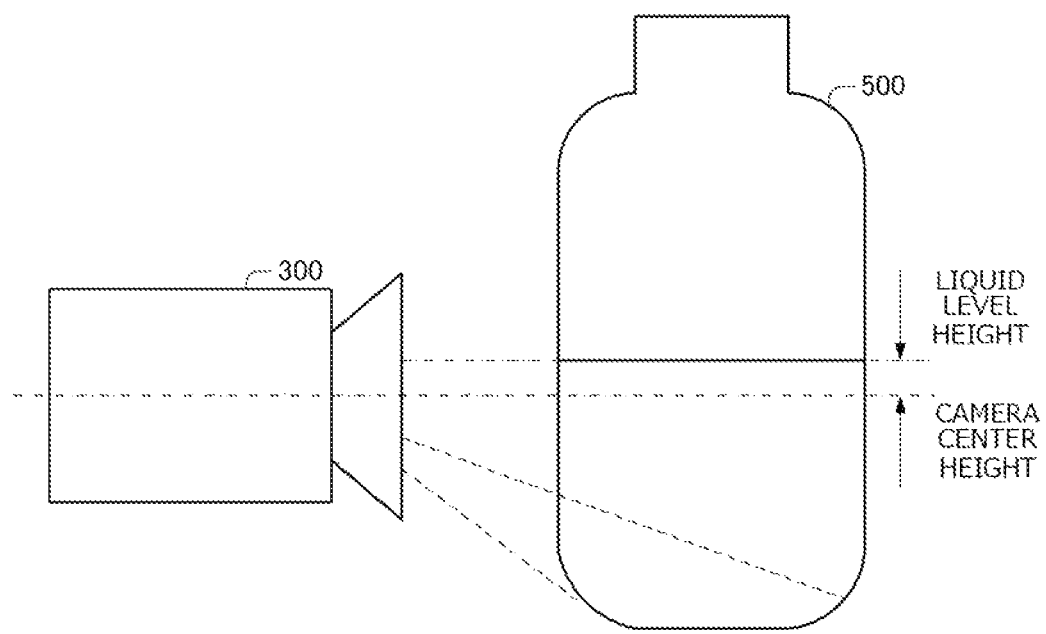
FIG. 6 is a view for describing a position of a camera.
Figure 7:
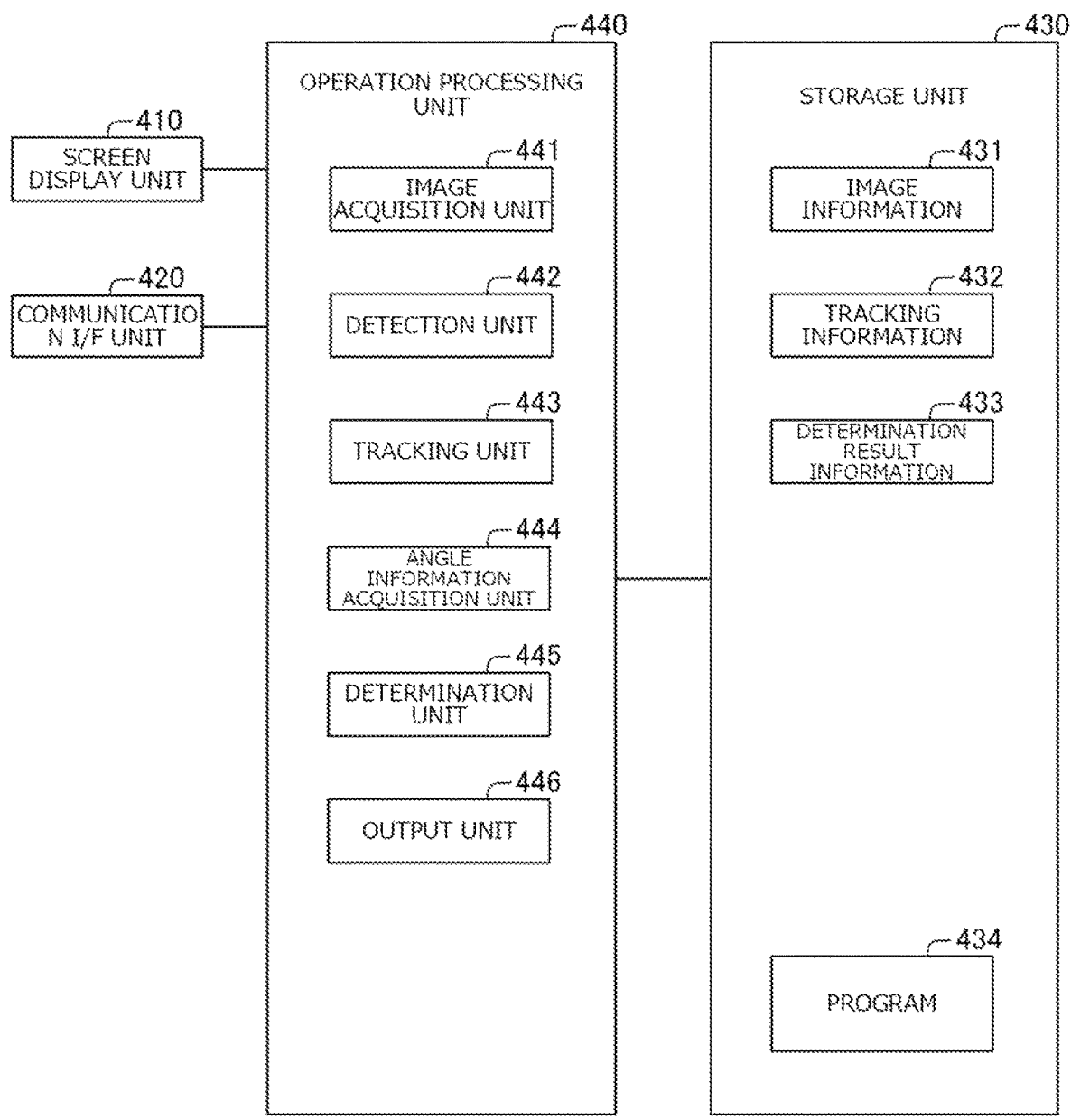
FIG. 7 is a block diagram showing an example of a configuration of a determination apparatus shown in FIG. 1.
Figure 8:
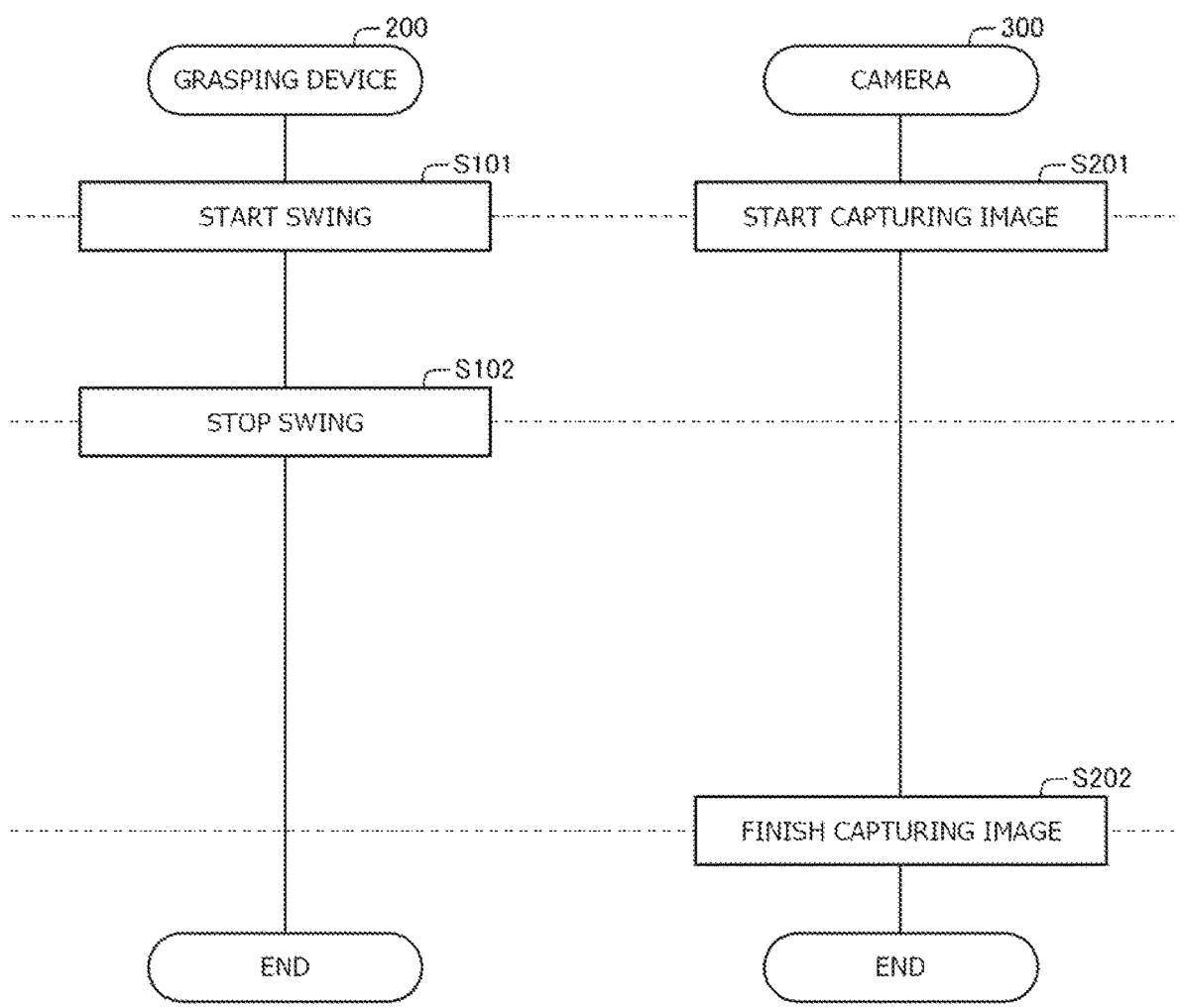
FIG. 8 is a flowchart showing an example of operations of a grasping device and the camera in the first example embodiment of the present disclosure.
Figure 9:
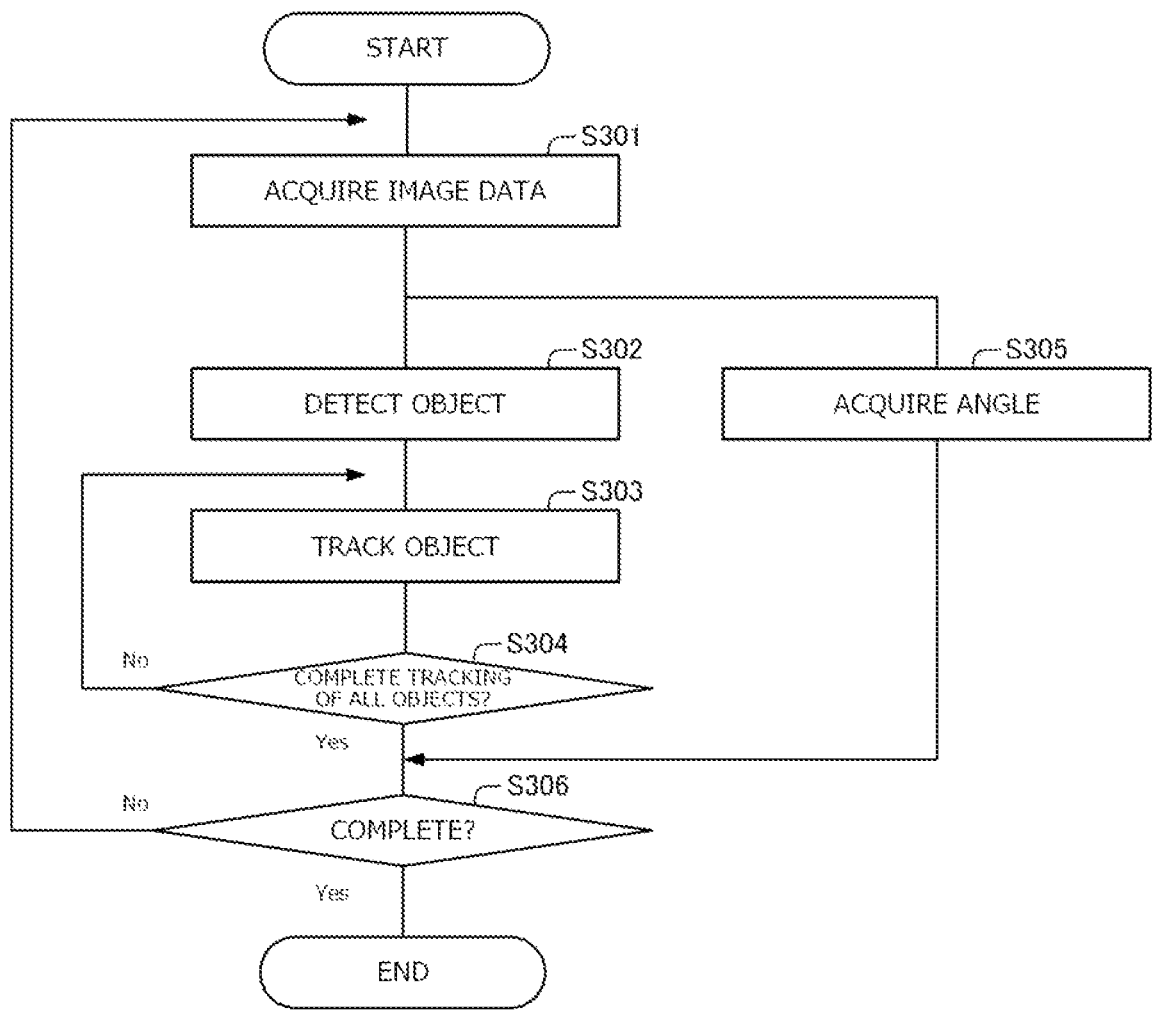
FIG. 9 is a flowchart showing an example of an operation of the overall determination apparatus in the first example embodiment of the present disclosure.
Figure 10:
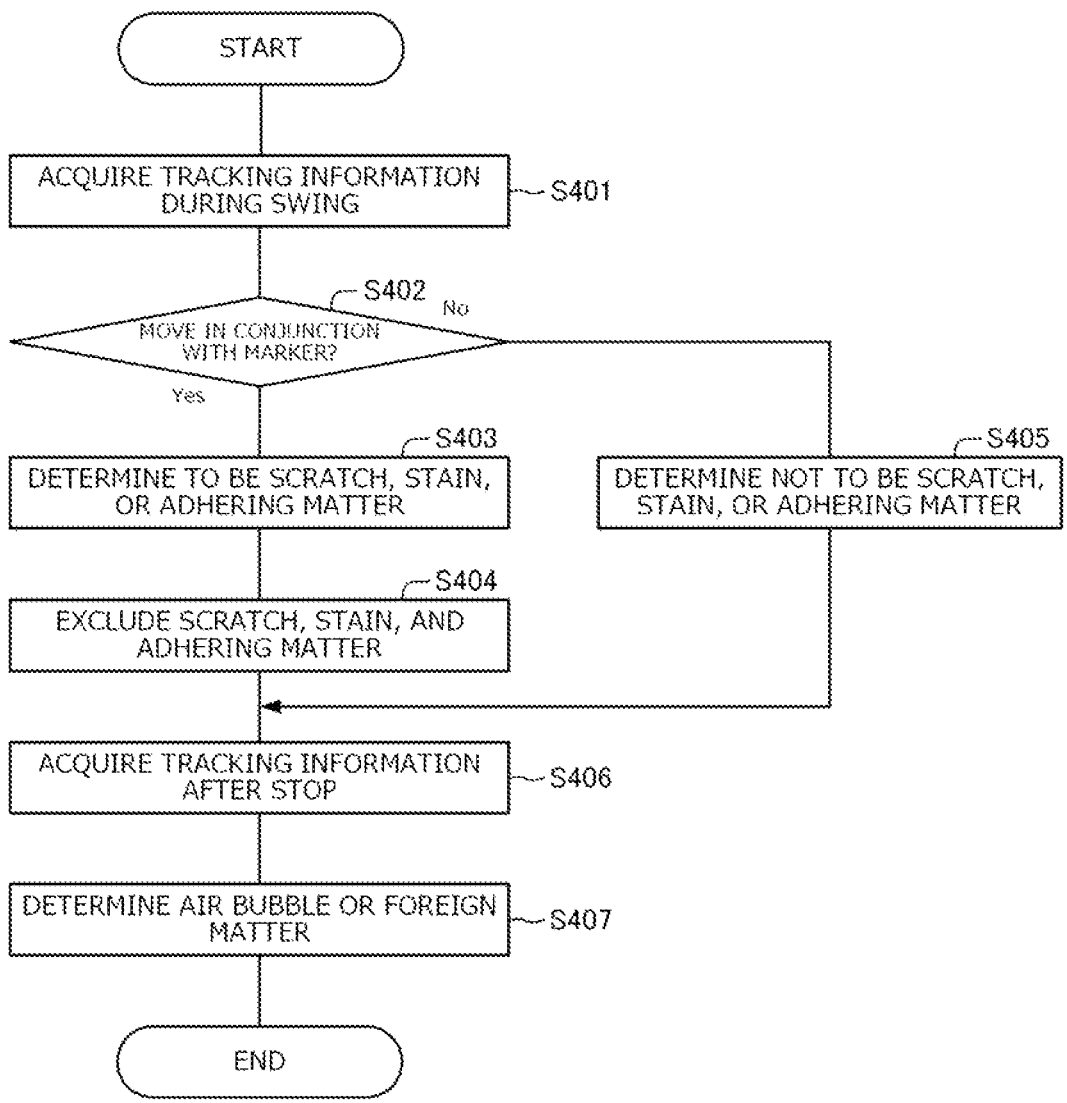
FIG. 10 is a flowchart showing an example of processing by a determination unit.
Figure 11:
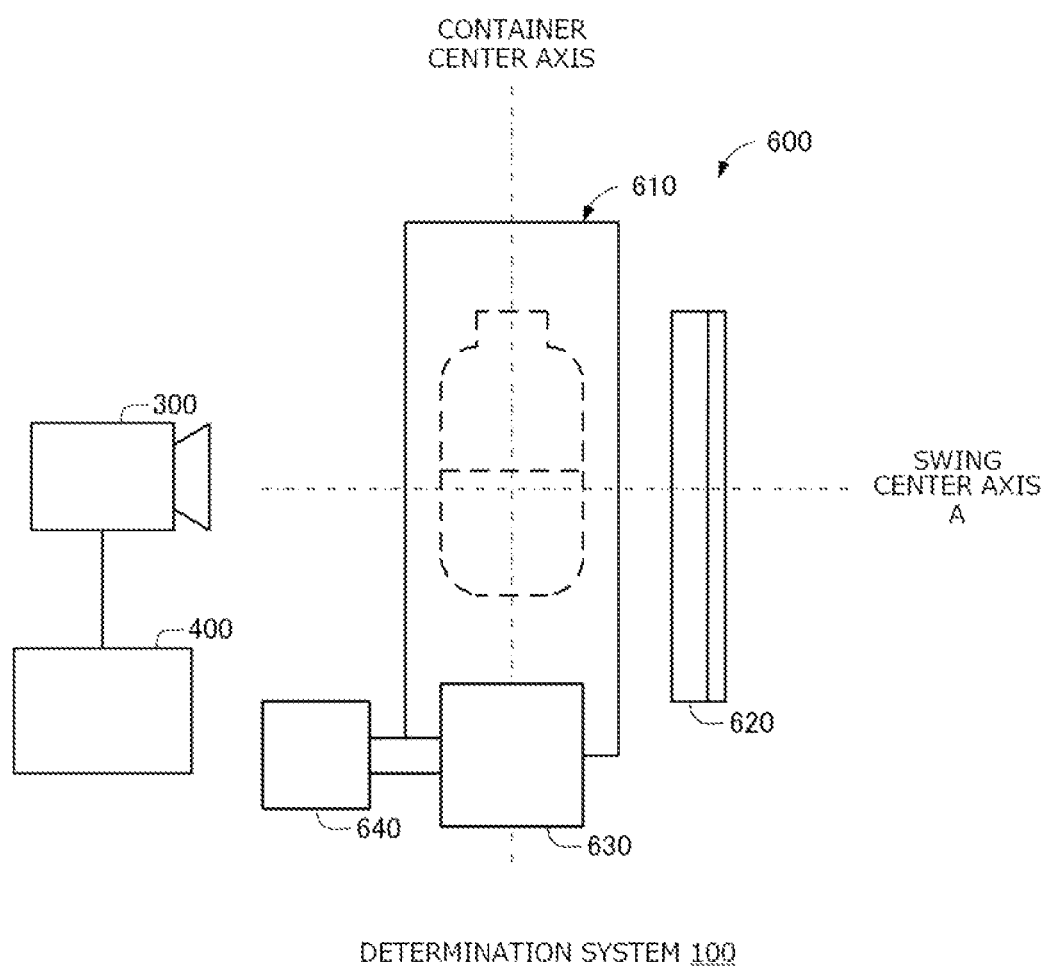
FIG. 11 is a view showing an example of a configuration of another grasping device included by the determination system.
Figure 12:
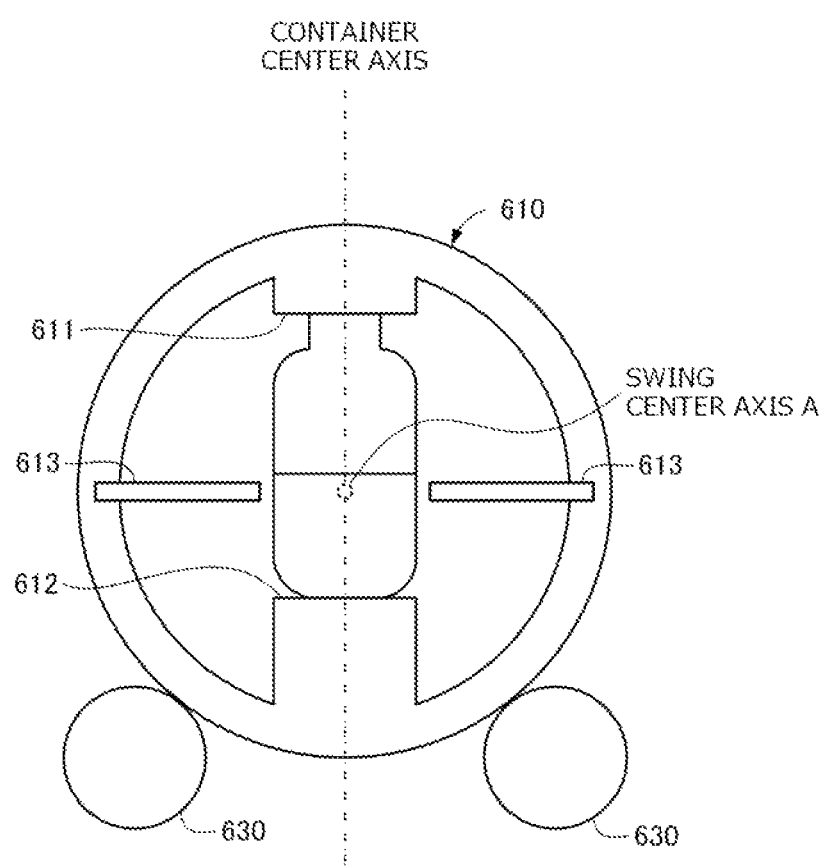
FIG. 12 is a view for describing the configuration example of the other grasping device.

A first example embodiment of the present disclosure will be described with reference to FIGS. 1 to 12. FIG. 1 is a view showing an example of a configuration of a determination system 100. FIG. 2 is a view showing an example of a positional relation between a container 500 and a marker 230. FIG. 3 is a view for describing an example of movement of the container 500. FIG. 4 is a view for describing a region of interest. FIG. 5 is a view for describing a swing center axis. FIG. 6 is a view for describing a position of a camera 300. FIG. 7 is a block diagram showing an example of a configuration of a determination apparatus 400. FIG. 8 is a flowchart showing an example of operations of a grasping device 200 and the camera 300. FIG. 9 is a flowchart showing an example of an operation of the determination apparatus 400. FIG. 10 is a flowchart showing an example of processing by a determination unit 445. FIG. 11 is a view showing an example of a configuration of a grasping device 600, which is another grasping device included by the determination system 100. FIG. 12 is a view for describing the example of the configuration of the grasping device 600 that is the other grasping device.

In the first example embodiment of the present disclosure, a determination system 100 will be described that detects objects mixed in the container 500 filled with liquid such as water or medicine and determines foreign matter such as hair or glass chip among the detected objects. As will be described later, the determination system 100 tilts/swings the container 500 while sandwiching and grasping the container 500. Moreover, in the determination system 100, a marker 230 is provided at a part that tilts in synchronism with the container 500 when the container 500 is tilted. According to such a configuration, a scratch and a stain on the container 500, adhering matter located outside the filled liquid and the like move in conjunction with the movement of the marker 230. As a result, it becomes possible to easily determine a scratch and a stain on the container 500, adhering matter located outside the filled liquid and the like based on image data showing the container 500 and the marker 230 captured and acquired by the fixed camera 300.

In the description of this example embodiment, in the state shown in FIG. 1, a side of the container 500 on which liquid is filled is defined as the upper side, and the opposite side is defined as the lower side. In FIG. 1, the liquid filled inside the container 500 gathers on the lower side of the container 500.

FIG. 1 is a side view showing an example of a configuration of the overall determination system 100. Referring to FIG. 1, the determination system 100 includes, for example, a grasping device 200 having a motor 240 serving as a rotating means, a camera 300, and a determination apparatus 400. As shown in FIG. 1, the camera 300 and the determination apparatus 400 are connected so as to be able to communicate with each other by wire or wirelessly. Moreover, the determination apparatus 400 and the grasping device 200 can be connected so as to be able to communicate with each other by wire or wirelessly.

The grasping device 200 is a device which tilts/swings and rotates the container 500 while sandwiching and grasping the container 500 filled with liquid from above and below. As shown in FIG. 1, the grasping device 200 has, for example, a body unit 210 including a grasping part including an upper grasping part 213 and a lower grasping part 214, an area light source 220, a marker 230, and a motor 240.

The body unit 210 tilts/swings and rotates in accordance with rotation of the motor 240 functioning as a rotating means. For example, the body unit 210 has a rectangular shape when viewed from the front. Meanwhile, in this example embodiment, a material that forms the body unit 210 is not particularly limited. The body unit 210 may be formed by any material such as resin or metal. Moreover, the shape of the body unit 210 may be other than the shape illustrated above.

FIG. 1 shows an example when the body unit 210 is viewed from the side. Referring to FIG. 1, the body unit 210 includes, for example, a flat portion 211 connected to the motor 240, an arm part 212 extending from an upper end and a lower end of the flat portion 211 toward the opposite side to a side on which the motor 240 is located, and the grasping part that is formed at an end of the arm part 212 on the opposite side to the side where the motor 240 is located and that sandwiches and grasps the container 500.

The grasping part includes the upper grasping part 213 that protrudes downward from the arm part 212 formed on the upper side and contacts the top of the container 500 (the side where liquid is filled in), and the lower grasping part 214 that protrudes upward from the arm part 212 formed on the lower side and contacts the bottom of container 500. As shown in FIG. 1, since the upper grasping part 213 contacts the container 500 from the top of the container 500 and the lower grasping part 214 contacts the container 500 from the bottom of the container 500, the grasping part thereby sandwiches and grasps the container 500 from above and below.

The upper grasping part 213 and the lower grasping part 214 can be configured to be adjustable in length. By configuring the upper grasping part 213 and the lower grasping part 214 to be adjustable in length, it is possible to grasp containers 500 of various sizes, and it is also possible to easily perform position adjustment (height adjustment) when the grasping part grasps the container 500. The length adjustment function may be implemented by using a known means, for example, by configuring the upper grasping part 213 and the lower grasping part 214 so as to have a first portion and a second portion, respectively, to make the first portion and the second portion slidable and fixable at any position.

The area light source 220 (light source) emits light to the liquid filled in the container 500. For example, the area light source 220 has a shape corresponding to the shape of the body unit 210, such as a rectangular shape when viewed from front. The area light source 220 may have a shape other than the illustrated shape.

For example, the area light source 220 is installed on the opposite side to a side where the camera 300 is installed when viewed from the container 500 and the grasping part. For example, referring to FIG. 1, the area light source 220 is installed on a surface of the flat portion 211 configuring the body unit 210 on the opposite side to the side where the motor 240 is located. With such a configuration, the area light source 220 emits light to the camera 300 through the container 500. That is to say, it can be said that the area light source 220 is installed in the body unit 210 so as to emit light to the camera 300 through the container 500.

Since the area light source 220 is installed on the flat portion 211 of the body unit 210, it can be said that the area light source 220 is configured integrally with the body unit 210 including the upper grasping part 213 and the lower grasping part 214. Therefore, for example, when the container 500 grasped by the upper grasping part 213 and the lower grasping part 214 is tilted, the area light source 220 is also tilted in synchronism with the tilt of the container 500.

The marker 230 is a structure for enabling acquisition of a rotation angle based on image data captured by the camera 300. The marker 230 is, for example, a film that has a rectangular shape having a size of about 0.5 mm square or a circular shape and does not transmit light, and is installed in a predetermined position on the area light source 220. The marker 230 may be a two-dimensional code or the like containing any information.

The marker 230 is installed at a predetermined position on the area light source 220 so that at least one marker 230 is shown in image data acquired by the fixedly installed camera 300 even when the container 500 is tilted. FIG. 2 shows an example of an installation position of the marker 230. For example, in the case illustrated in FIG. 2, the markers 230 are set at two positions; a position outside the container 500 near the left side surface of the container 500 and a position outside the container 500 near the right side surface of the container 500 in a state where the container 500 is not tilted. Moreover, in the case illustrated in FIG. 2, the markers 230 are provided at a height approximately equal to the height of a swing center axis A, which is an axis when the container 500 is tilted.

If at least one marker 230 is shown in the image of the liquid even when the container 500 is tilted, the marker 230 may be installed at a position other than the position illustrated above. Moreover, the number of the markers 230 to be installed may be determined freely, such as one or three or more.

Further, the marker 230 may be installed on any part other than the area light source as long as it is a part that moves in synchronism with the body unit 210 including the upper grasping part 213 and the lower grasping part 214. For example, the marker 230 may be implemented by a protruding part or the like that protrudes toward the container 500 from a part of the body unit 210 located on the side surface of the container 500 when the container 500 is grasped. The marker 230 may be implemented by a method other than the method illustrated above.

By rotating in accordance with electric power supplied from outside, the motor 240 functions as a rotating means (tilting unit) that tilts the body unit 210 to tilt/swing and rotate the container 500 grasped by the upper grasping part 213 and the lower grasping part 214. For example, the motor 240 is connected to the flat portion 211 of the body unit 210, and the motor 240 can tilt/swing and rotate the body unit 210 by rotating.

FIG. 3 shows an example of how the container 500 grasped by the upper grasping part 213 and the lower grasping part 214 is tilted. As shown in FIG. 3, the motor 240 can tilt the container 500 in a forward direction (for example, counterclockwise direction) and tilt the container 500 in a reverse direction (for example, clockwise direction). As an example, the motor 240 can tilt/swing the container 500 so that the state of the container 500 transits in an order of a state in which the container 500 is not tilted (0 degrees), a state in which the container 500 is tilted 90 degrees in the forward direction, a state in which the container 500 is not tilted, a state in which the container 500 is tilted 90 degrees in the reverse direction, and a state in which the container 500 is not tilted That is to say, the motor 240 can swing the container 500 around the swing center axis A while switching between the normal and reverse directions.

In capturing image data with the camera 300, it is desirable that a region of interest (inside liquid and bottom of bottle) as shown in FIG. 4 is efficiently held within the angle of view of the camera 300 even when the container 300 is tilted. Therefore, it is desirable that, for example, as shown in FIG. 5, the swing rotation axis A is not adjusted to be a center height A of the container 500 when the container 500 is not tilted, but adjusted to be a liquid level height B or a liquid center height C (or between the liquid level height B and the liquid center height C, or the like) when the container 500 is not tilted. For example, in the case of the grasping device 200 described in this example embodiment, the swing center axis A to be the center when the body unit 210, the grasped container 500 and the like tilt is determined in accordance with a position where the motor 240 and the flat portion 211 are connected. Moreover, by adjusting the lengths of the upper grasping part 213 and the lower grasping part 214, it is possible to adjust the positional relation between the swing center axis A and the container 500 and between the swing center p A and the liquid filled inside the container 500. Therefore, it can be said to be desirable that a position where the motor 240 and the flat portion 211 are connected and the lengths of the upper grasping part 213 and the lower grasping part 214 are determined in advance and corrected as necessary so that the swing center axis A is located at a desirable position in accordance with the size of the container 500, the amount of liquid at the liquid level height B, the liquid center height C or the like, and others.

An angle at which the motor 240 tilts the container 500 is not limited to being up to 90 degrees. For example, the angle at which the motor 240 tilts the container 500 may be determined as necessary in accordance with the property of the liquid filled in the container 500 and the property of foreign matter to be detected.

Further, the motor 240 can start and stop swing in accordance with an instruction received from the determination apparatus 400 to be described later. The motor 240 may start and stop swing manually, for example.

The camera 300 is an imaging device that images the container 500 to acquire image data. For example, the camera 300 is previously installed at a predetermined position on the opposite side to a side where the area light source 220 is located when viewed from the upper grasping part 213 and the lower grasping part 214. As shown in FIG. 1, the grasping device 200 and the camera 300 are not configured integrally. Therefore, the camera 300 does not tilt even when the body unit 210 and others are tilted. That is to say, in this example embodiment, the camera 300 acquires image data in a state fixed at the previously installed position.

For example, the camera 300 acquires image data at a high frame rate of approximately 150 to 200 fps. Then, the camera 300 transmits the acquired image data to the determination apparatus 400 together with information indicating the imaging time, and the like. The camera 300 may acquire image data at a frame rate other than that illustrated above.

It is highly possible that foreign matter in a liquid filled in the container 500 remains in a region of interest as shown in FIG. 4 (that is, inside of liquid or bottom of bottle). Therefore, it is desirable to install the camera 300 so as to be able to efficiently image the region of interest. For example, it is desirable to determine the installation position of the camera 300 so that the center of the camera 300 is located higher than the lower end of the container 500 and the entire bottom surface (bottom of bottle) of the container 500 is shown as close as possible within a range where the depth of field can be maintained. Moreover, it is desirable that the camera 300 uses a wide-angle lens. By thus installing the camera 300, for example, it is possible to detect even foreign matter that has a large mass and does not largely float without missing it.

Further, it is desirable to install the camera 300 so that a region where the inside of the liquid and the liquid level overlap within a range where the entire liquid filled in the container 500 is shown is as small as possible. For example, it is desirable to install the camera 300 so as to capture an image from a direction as horizontal as possible to the liquid level.

To summarize the above, it can be said that the installation position of the camera 300 is desirably in a state as shown in FIG. 6, for example. Referring to FIG. 6, it can be seen that the center height of the camera 300 is set to be at a position equal to or lower than the liquid level and higher than the bottom of the bottle and the entire bottom of the bottle is shown. It can also be seen that the center height of the camera 300 is set to be lower than the height of the liquid level and is as close to the height of the liquid level as possible.

The determination apparatus 400 is an information processing apparatus that detects an object mixed inside the container 500 filled with a liquid and determines foreign matter based on image data captured/acquired by the camera 300. FIG. 7 shows an example of a configuration of the determination apparatus 400. Referring to FIG. 7, the determination apparatus 400 has, as major components, a screen display unit 410, a communication I/F unit 420, a storage unit 430, and an operation processing unit 440, for example.

The screen display unit 410 includes a screen display device such as a LCD (Liquid Crystal Display). The screen display unit 410 can display on a screen various kinds of information stored in the storage unit 43 such as image information 431, tracking information 432 and determination result information 433 in accordance with an instruction from the operation processing unit 440.

The communication I/F unit 420 includes a data communication circuit. The communication I/F unit 420 performs data communication with the camera 300, an external device and the like connected via a communication line.

The storage unit 430 is a storage device such as a hard disk and a memory. The storage unit 430 stores therein processing information necessary for various kinds of processing by the operation processing unit 440 and a program 434. The program 434 is loaded to and executed by the operation processing unit 440 to implement various kinds of processing units. The program 434 is previously loaded from an external device or a recording medium via a data input/output function such as the communication I/F unit 420, and is stored in the storage unit 430. Major information stored in the storage unit 430 are, for example, the image information 431, the tracking information 432, and the determination result information 433.

The image information 431 includes image data acquired by the camera 300. In the image information 431, for example, the image data is associated with information indicating time and date of acquisition of the image data by the camera 300 (information indicating the imaging time).

The tracking information 432 includes information corresponding to the result of tracking by a tracking unit 343. For example, in the tracking information 432, identification information assigned to each object is associated with time-series information indicating the position of the object. Moreover, the time-series information indicating the position of the object includes, for example, time information and position information such as coordinates indicating the position of the object at each time.

The tracking information 432 may include, other than the time-series information of the position of the object, for example, time-series information of angle information indicating the angle of the container 500, information indicating the area of a detection region, and the like. Moreover, the position information such as the coordinates indicating the position of the object may indicate XY coordinates in each image data, or may indicate coordinates obtained by correcting the XY coordinates in each image data based on the information indicating the angle of the container 500 (for example, coordinates obtained by correcting to a position when the container 500 is not tilted).

The determination result information 433 includes information indicating the result of determination by the determination unit 445. For example, in the determination result information 433, identification information assigned to each object is associated with information indicating the result of determination based on the tracking information 432 by the determination unit 445. That is to say, the determination result information 433 includes information indicating whether the detected object is foreign matter, an air bubble, or a scratch, a stain or the like on the container.

The operation processing unit 440 has a microprocessor such as a MPU and a peripheral circuit thereof. The operation processing unit 440 loads the program 434 from the storage unit 434 and executes the program 434 to make the abovementioned hardware cooperate with the program 434 and implement various kinds of processing units. Major processing units implemented by the operation processing unit 440 are, for example, an image acquisition unit 441, a detection unit 442, a tracking unit 443, an angle information acquisition unit 444, a determination unit 445, and an output unit 446.

The image acquisition unit 441 acquires image data acquired by the camera 300 from the camera 300 via the communication I/F unit 420. Then, the image acquisition unit 441 associates the acquired data with, for example, time and date of acquisition of the image data (information indicating the imaging time), and stores as the image information 431 into the storage unit 430.

The detection unit 442 detects an object existing within a region corresponding to the container 500 and liquid filled in the container 500. For example, the detection unit 442 performs a binarization process on the image data and detects an object based on the result of the binarization process. Meanwhile, the detection unit 442 may detect an object by using other known techniques.

The tracking unit 443 tracks an object detected by the detection unit 442. As described above, the camera 300 acquires image data at a high frame rate such as 200 fps. Therefore, it is assumed that the positions of the same object are extremely close between two pieces of image data with consecutive imaging times (the imaging times are closer than a predetermined value). Then, the tracking unit 443 compares the position of an object detected by the detection unit 442 with the position of an object detected by the detection unit 442 in image data with the previous imaging time (or within a predetermined value). In a case where a distance between the objects is equal to or less than a predetermined threshold value, the tracking unit 443 determines that the object detected by the detection unit 442 and the object detected by the detection unit 442 in the image data with the previous imaging time that are separated by a distance equal to or less than the threshold value are the same objects. In this case, the tracking unit 443 provides the object detected by the detection unit 442 with identification information such as ID provided to the object determined to be the same object. On the other hand, in a case where the image data with the previous imaging time (or within the predetermined value) does not show an object with a distance equal to or less than the predetermined threshold value from the object detected by the detection unit 442, the tracking unit 443 determines that a new object is detected. In this case, the tracking unit 443 provides the detected object with identification information such as new ID.

For example, as described above, the tracking unit 443 provides an object detected by the detection unit 442 with identification information by performing tracking based on a distance between objects in different image data. Moreover, the tracking unit 443 acquires coordinates indicating the position of the object detected by the detection unit 442. Then, the tracking unit 443 associates the identification information, time information indicating the imaging time of the image data, and the coordinates, and stores as the tracking information 432 into the storage unit 430. The tracking unit 443 may store XY coordinates in the image data into the storage unit 430 as the tracking information 432, or may store coordinates obtained by correcting XY coordinates in each image data based on information indicating the angle of the container 500 acquired by the angle information acquisition unit 444 (for example, coordinates corrected to a position in a case where the container 500 is not tilted) into the storage unit 430 as the tracking information 432.

The angle information acquisition unit 444 acquires angle information indicating an angle at which the container 500 is tilted based on the position of the marker 230 in image data. For example, calibration of the tilt angle of the container 500 and the position of the marker 230 in the image data is performed in advance. Therefore, the angle information acquisition unit 444 can acquire angle information indicating an angle at which the container 500 is tilted based on the position of the marker 230 in the image data.

Upon acquisition of the angle information, the angle information acquisition unit 444 can store the acquired angle information into the storage unit 430 together with time information indicating the imaging time of the image data. As described above, the angle information acquisition unit 444 may store the angle information into the storage section 430 as one of the information included by the tracking information 432.

Based on the tracking information 432, the determination unit 445 determines whether an object detected by the detection unit 442 is an air bubble, foreign matter, or a scratch, stain or adhering matter on the container 500. In this example embodiment, the determination unit 445 can perform a determination based on time-series information while the container 500 is swinging and a determination based on time-series information after the swing is finished (that is, after the container 500 stops in the state shown in FIG. 1). The determination unit 445 can determine whether or not the container 500 is swinging based on the angle information included by the tracking information 432.

For example, the determination unit 445 determines whether or not an object detected by the detection unit 442 is a scratch or stain on the container 500 or adhering matter adhering to the container 500 based on the time-series information while the container 500 is swinging included by the tracking information 432. As described above, the marker 230 is installed on the area light source 220 installed on the body unit 210 that tilts in synchronism with the container 500. Therefore, a scratch and a stain on the container 500, an adhering matter located outside the filled liquid and the like move in conjunction with the movement of the marker 230. For example, the movement in conjunction described above refers to movement in full conjunction such that, when the marker 230 starts movement, a scratch and a stain on the container 500, adhering matter located outside the filled liquid and the like immediately start movement and, when the marker 230 stops movement, the scratch and stain on the container 500, the adhering matter located outside the filled liquid and the like immediately stop movement. Then, the determination unit 445 determines that an object moving in conjunction with the movement of the marker 230 among the objects detected by the detection unit 442 is a scratch or stain on the container 500, adhering matter, or the like based on the time-series information while the container 500 is swinging. On the other hand, the determination unit 445 determines that an object which is not moving in conjunction with the movement of the marker 230 among the objects detected by the detection unit 442 is not a scratch or stain on the container 500, adhering matter, or the like. That is to say, the determination unit 445 determines that the object that is not moving in conjunction with the movement of the marker 230 is possibly an air bubble or foreign matter.

Further, the determination unit 445 determines whether the object detected by the detection unit 442 is an air bubble or foreign matter based on the time-series information after the swing is finished included by the tracking information 432. The determination unit 445 can perform the above determination on all the objects detected by the detection unit 442, excluding an object determined by the determination unit 445 as a scratch, a stain or adhering matter on the container. For example, in a case where it is determined that the object is moving upward based on the time-series information after the swing stops, the determination unit 445 determines that the object is an air bubble. On the other hand, in a case where it is determined that the object is moving downward based on the time-series information after the swing stops, the determination unit 445 determines that the object is foreign matter. For example, as described above, the determination unit 445 can determine whether the object is an air bubble or foreign matter based on the movement direction of the object indicated by the time-series information after the swing stops. Meanwhile, the determination unit 445 may determine whether the object is an air bubble or foreign matter by a method other than the method illustrated above, such as performing the determination by using a model that has been learned in advance.

For example, as described above, after determining a scratch or the like of the container 500 among the objects, the determination unit 445 determines whether the remaining object is an air bubble or foreign matter. Then, the determination unit 445 stores the result of determination of the respective objects detected by the detection unit 442 as the determination result information 433 into the storage unit 430. In this example embodiment, a timing at which the determination unit 445 performs the determination is not particularly limited. For example, the determination unit 445 may be configured to determine in real time while the container 500 is swinging whether or not the object is a scratch or the like, or may be configured to perform the series of processing described above after the time-series data during and after the swing are completed.

The determination unit 445 may be configured to perform the determination of movement in conjunction with the marker 230 and the determination whether the object is an air bubble or foreign matter in parallel. That is to say, the determination unit 445 may start the determination whether the object is an air bubble or foreign matter before the swing finishes. Moreover, the determination unit 445 may use information other than the tracking information 432 when determining the object. For example, the determination unit 445 can determine the object by using information indicating the image characteristics of the object, the size, the average luminance value, and the like. By performing the determination also using information other than movement, such as the size of the object and average luminance value, it is possible to comprehensively judge the characteristics of an air bubble and foreign matter, and consequently, higher determination accuracy can be obtained.

The output unit 446 outputs the image information 431, the tracking information 432, the determination result information 433 and the like. For example, the output unit 446 can display the image information 431, the tracking information 432, the determination result information 433 and the like on the screen display unit 410, and transmit them to an external device via the communication IN unit 420.

The above is an example of the configuration of the determination apparatus 400.

The determination apparatus 400 may have a configuration other than that described above. For example, the determination apparatus 400 can be configured to instruct the grasping device 200 to start swing or to stop swing. For example, in a case where a condition is satisfied such that a predetermined period of time has passed since the start of swing or the number of swings (the number of times of tilting in the forward direction and the number of times of tilting in the reverse direction) has reached a predetermined number of times, the determination apparatus 400 can instruct the grasping device 200 to stop swing.

Further, the determination apparatus 400 can instruct the grasping device 200 to perform a rotation operation for peeling off foreign matter and the like fixedly adhering to the wall surface of the container 500 before instructing the start of swing. That is to say, the determination apparatus 400 may be configured to instruct the start of swing after instructing the rotation operation.

The container 500 is a translucent container such as a glass bottle or a plastic bottle. The inside of the container 500 is filled with liquid such as water or medicine. The container 500 may have a scratch, a stain and the like. Moreover, foreign matter may be mixed inside the container 500. Examples of foreign matter include a rubber piece, hair, a fiber piece, soot, and a glass or plastic chip.

The above is an example of the configurations of the grasping device 200, the camera 300, the determination apparatus 400, and the container 500 included by the determination system 100. Next, an example of an operation of the determination system 100 will be described with reference to FIGS. 8 to 10. First, with reference to FIG. 8, the relation between a timing at which the grasping device 200 swings the container 500 and a timing at which the camera 300 captures an image will be described.

Referring to FIG. 8, the grasping device 200 tilts the container 500, for example, in accordance with an instruction by the determination apparatus 400 (step S101). That is to say, the grasping device 200 starts swing. Moreover, for example, at a timing at which the grasping device 200 starts swing, the camera 300 starts capturing an image (step S201). The camera 300 may start capturing an image before the grasping device 200 starts swing, or may start capturing an image after the grasping device 200 starts swing.

The grasping device 200 stops swing, for example, in accordance with an instruction by the determination apparatus 400 (step S102). As shown in FIG. 8, at a timing that the grasping device 200 stops swing, the camera 300 does not finish capturing an image. Therefore, the camera 300 captures an image while the grasping device 200 swinging the container 500, and also continues capturing an image after the grasping device 200 stops swing.

The camera 300 finishes capturing an image (step S202). In this example embodiment, a condition that the camera 300 finishes capturing an image is not specifically limited. The camera 300 can finish capturing an image in a case where a predetermined condition is satisfied, for example, a predetermined time has passed since the start of swing, a predetermined time has passed after the stop of swing, or the determination by the determination unit 445 has been completed for all objects detected by the detection unit 442.

The above is an example of the relation between the timing at which the grasping device 200 swings the container 500 and the timing at which the camera 300 captures an image. As described above, in this example embodiment, the camera 300 captures an image of the grasping device 200 swinging the container 500, and also continues capturing an image after the swing stops. Next, an example of an operation of the overall determination apparatus 400 will be described with reference to FIG. 9.

Referring to FIG. 9, the image acquisition unit 441 acquires image data acquired by the camera 300 from the camera 300 via the communication I/F unit 420 (step S301).

The detection unit 442 detects an object existing within a region corresponding to the container 500 and liquid filled in the container 500 based on the image data (step S302). The detection unit 442 may detect the object by using a known technique.

The tracking unit 443 tracks the object detected by the detection unit 442 (step S303). For example, the tracking unit 443 tracks the object based on a distance between objects in image data with close (or consecutive) imaging times.

In a case where the tracking unit 443 has not tracked all the objects detected by the detection unit 422 in the image data (step S304, No), the tracking unit 443 tracks an object having not been tracked. On the other hand, in a case where the tracking unit 443 has tracked all the objects detected by the detection unit 422 in the image data (step S304, Yes), the tracking unit 443 completes the tracking.

Further, the angle information acquisition unit 444 acquires angle information indicating an angle at which the container 500 tilts based on the location of the marker 230 in the image data (step S305).

In a case where all of a series of image data captured by the camera 300 have been acquired (step S306, Yes), the determination apparatus 400 finishes the processing. On the other hand, in a case where image data having not been acquired is left (step S306, No), the image acquisition unit 441 acquires the image data from the camera 300 (step S301).

The above is an example of the operation of the determination apparatus 400. Meanwhile, the determination apparatus 400 may perform the processing in an order other than that illustrated above, such as performing the processing at step S302 and later after acquiring all of the series of image data captured by the camera 300. Next, an example of processing by the determination unit 445 will be described with reference to FIG. 10.

Referring to FIG. 10, the determination unit 445 acquires time-series information while the container 500 is swinging included by the tracking information 432 (step S401).

In a case where there is an object moving in conjunction with the movement of the marker 230 among objects detected by the detection unit 442 (step S402, Yes), the determination unit 445 determines that the object moving in conjunction with the movement of the marker 230 is a scratch, stain, adhering matter or the like on the container 500 (step S403). Then, the determination unit 445 excludes the object determined to be a scratch, stain, adhering matter or the like on the container 500 from objects to be determined in a process at step S407 (step S404). On the other hand, in a case where there is an object that does not move in conjunction with the movement of the marker 230 (step S402, No), the determination unit 445 determines that the object not moving in conjunction with the movement of the marker 230 is not a scratch, stain, adhering matter or the like on the container 500 (step S405).

Further, the determination unit 445 acquires time-series information after the container 500 stops swinging included by the tracking information 432 (step S406). Then, the determination unit 445 determines whether the object detected by the detection unit 442 is an air bubble or foreign matter based on the time-series information after the swing finishes included by the tracking information 432 (step S407). For example, the determination unit 445 can determine whether the object is an air bubble or foreign matter based on the moving direction of the object indicated by the time-series information after the swing stops. The determination unit 445 may perform the determination by a method other than that illustrated above.

The above is an example of the processing by the determination unit 445. In this example embodiment, a timing at which the determination unit 445 performs the determination is not specifically limited. For example, the determination unit 445 may be configured to determine whether or not the object is a scratch or the like in real time while the container 500 is swinging, or may perform the series of processing described above after the time-series data during and after the swing are obtained.

Thus, the grasping device 200 has the marker 230 installed on the area light source 220 that tilts in synchronism with the container 500 when tilting the grasped container 500. With such a configuration, when the grasped container 500 is tilted, a scratch and a stain on the container 500 and adhering matter and the like located outside the filled liquid move in conjunction with the movement of the marker 230. As a result, based on image data showing the container 500 and the marker 230 acquired by the fixed camera 300, a scratch and a stain on the container 500 and adhering matter and the like located outside the filled liquid can be easily determined.

Further, with the above configuration, based on the image data captured/acquired by the fixed camera 300, angle information indicating an angle at which the container 500 tilts can be easily acquired. Although the angle information can be acquired, for example, from an encoder of the motor 240 serving as a rotating means, acquisition of the angle information from the encoder makes the configuration of the determination system 100 complicated. By installing the marker 230 as described above, it becomes possible to easily acquire the angle information without making the configuration complicated.

Further, with the configuration described above, it is possible to determine a scratch and the like on the container 500 beforehand. Consequently, the determination unit 445 can determine whether an object excluding the scratch and the like on the container 500 beforehand is an air bubble or foreign matter. As a result, it is possible to suppress erroneous determination of a scratch and the like on the container 500 as an air bubble or foreign matter, and it is possible to increase the accuracy of the determination.

In this example embodiment, an example of the configuration of the determination system 100 has been described. However, the configuration of the determination system 100 is not limited to that illustrated in this example embodiment. For example, the determination system 100 may have a grasping device 600 as shown in FIGS. 11 and 12 instead of the grasping device 200 illustrated in FIG. 1 and others.

As well as the grasping device 200, the grasping device 600 is a device that sandwiches and grasps the container 500 filled with liquid from above and below and tilts the container 500 in this state. As shown in FIG. 11, the grasping device 600 includes, for example, a body unit 610 including a grasping part including an upper grasping part 611 and a lower grasping part 612, an area light source 620, a gear 630, and a motor 640.

The body unit 610 tilts/swings and rotates in accordance with the rotation of the gear 630 and the motor 640 that function as a rotating means. For example, the body unit 610 has a cylindrical shape and is configured to be able to grasp the container 500 inside. As well as the body unit 210, the body unit 610 may be formed by any material. Moreover, the shape of the body unit 610 may be other than that illustrated above.

FIG. 11 shows an example of the body unit 610 viewed from the side, and FIG. 12 shows an example of the main body 610 viewed from the front. Referring to FIGS. 11 and 12, the body unit 610 includes the grasping part for grasping the container 500 and a pair of marker parts 613 protruding toward the container 500 from parts of the body unit 610 located on the side surface of the container 500 when the container 500 is grasped. Moreover, the body unit 610 meshes with the gear 630 and is configured to tilt/swing in accordance with the rotation of the gear 630.

The grasping part includes the upper grasping part 611 formed on the upper inner peripheral surface of the body unit 610 and protruding downward, and the lower grasping part 612 formed on the lower inner peripheral surface of the body unit 610 and protruding upward. As shown in FIG. 12, the upper grasping part 611 contacts the container 500 from above the container 500, the lower grasping part 612 contacts the container 500 from below the container 500, and the grasping part thereby sandwiches the container 500 from above and below and grasps the container 500.

As in the case of the grasping device 200, the upper grasping part 611 and the lower grasping part 612 may be configured to be adjustable in length.

As well as the marker 230, the marker part 613 is a structure for enabling acquisition of a rotation angle based on image data captured by the camera 300. In the vicinity of the inner tip of the marker part 613, a two-dimensional code or the like may be installed. The marker part 613 can employ various modification examples as well as the marker 230.

The area light source 620 emits light to liquid filled inside the container 500. For example, the area light source 620 may have a shape corresponding to the shape of the body unit 610, such as a circular shape when viewed from the front, or may be a rectangular shape or the like.

For example, as well as the area light source 220, the area light source 620 is installed on the opposite side to a side where the camera 300 is installed when viewed from the container 500 and the grasping part. In the case of the grasping device 600, unlike the grasping device 200, the area light source 620 may be configured not to be integral with the body unit 610. The area light source 620 may be configured to be integral with the body unit 610.

The gear 630 and the motor 640 function as a rotating means for rotating the body unit 610. The motor 640 rotates in accordance with electric power supplied from outside, and thereby rotates the gear 630. Moreover, the gear 630 transmits the rotation of the motor 640 to the body unit 610. Consequently, the body unit 610 tilts/swings in accordance with the rotation of the motor 640.

For example, as described above, the determination system 100 may have the grasping device 600 instead of the grasping device 200. The determination system 100 having the grasping device 600 can also have the same action and effect as in the case of having the determination device 200. The grasping device included by the determination system 100 may have a characteristic that combines the characteristic of the grasping device 200 and the characteristic of the grasping device 600.

Further, in this example embodiment, a case of implementing the function of the determination apparatus 400 by a single information processing apparatus has been described. However, the function of the determination apparatus 400 may be implemented by a plurality of information processing apparatuses connected via a network. For example, in this example embodiment, the determination apparatus 400 can be configured to instruct the grasping device 200 to start swing and stop swing. However, the determination system 100 may have an instruction apparatus that performs the above instruction as an apparatus different from the determination apparatus 400.

Second Example Embodiment

Next, a second example embodiment of the present invention will be described with reference to FIGS. 13 to 15. In the second example embodiment, the outline of configurations of a grasping device 700 and a determination apparatus 800 will be described.

Figure 13:
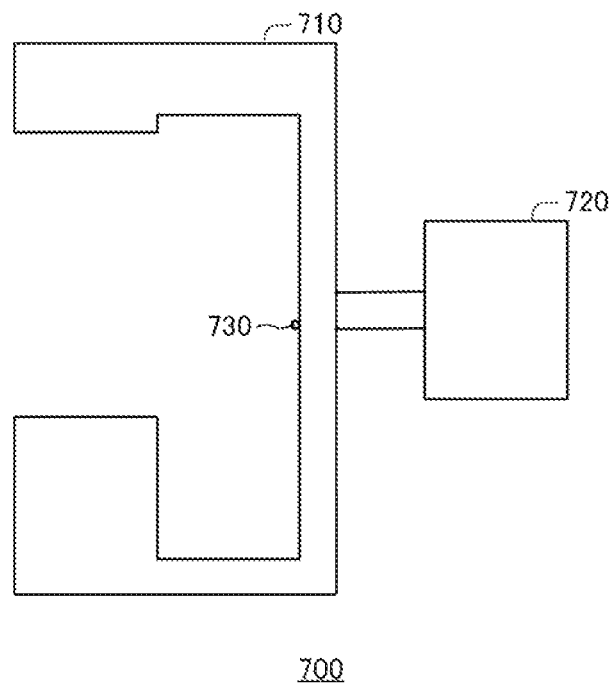
FIG. 13 is a view showing an example of a configuration of a grasping device in a second example embodiment of the present disclosure.

FIG. 13 shows an example of the configuration of the grasping device 700. Referring to FIG. 13, the grasping device 700 includes a grasping unit 710, a tilting unit 720, and a marker 730.

The grasping unit 710 grasps a container filled with liquid. The tilting unit 720 at least tilts the container in a state where the grasping unit 710 grasps the container. For example, the tilting unit 720 is a motor or the like, and tilts the container by tilting the grasping unit 710. The marker 730 is installed at a part tilting in synchronism with the container when the container tilts, and moves in conjunction with the movement of the container. For example, the marker 730 is installed on the grasping unit 710.

Thus, the grasping device 700 includes the grasping unit 710, the tilting unit 720, and the marker 730. With such a configuration, when the grasped container is tilted, a scratch and stain on the container, and adhering matter and the like located outside the filled liquid move in conjunction with the movement of the marker 730. As a result, based on image data showing the container and the marker 730 acquired by a fixed camera, a scratch and stain on the container, and adhering matter and the like located outside the filled liquid can be easily determined.

Figure 14:
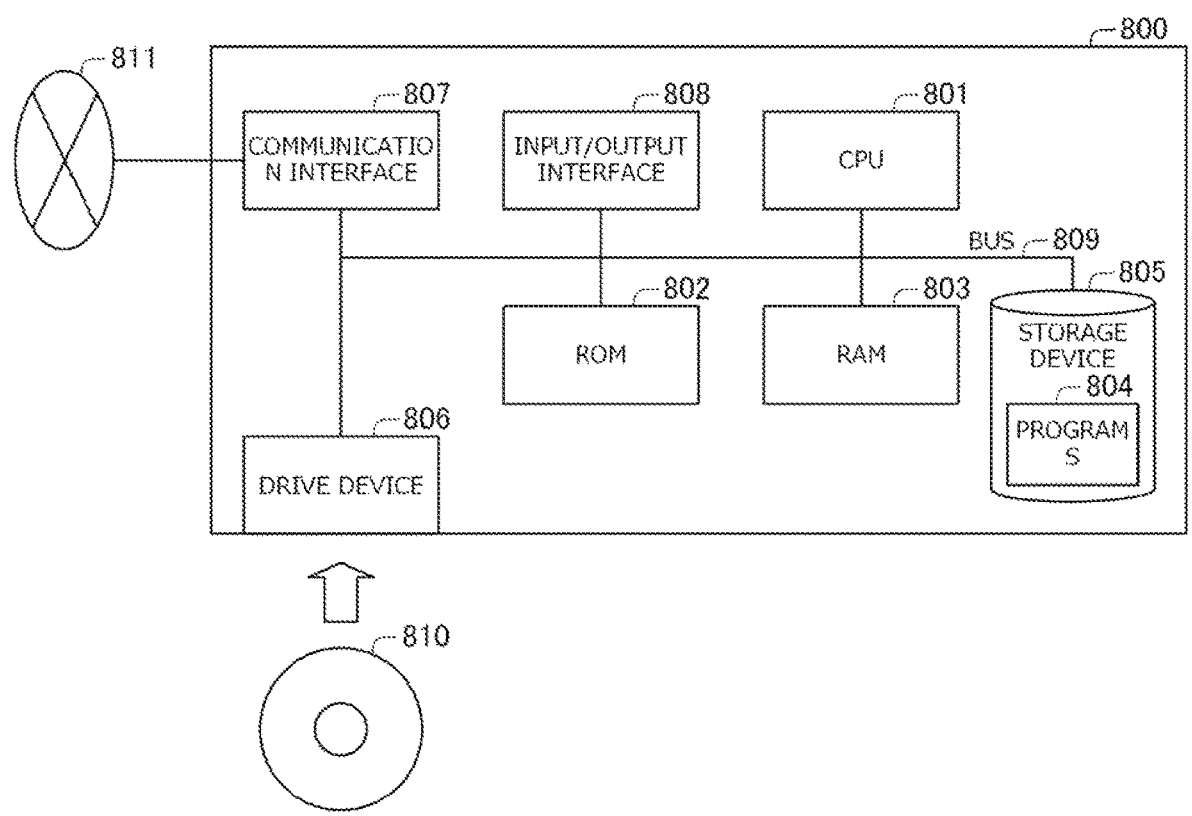
FIG. 14 is a view showing an example of a hardware configuration diagram of a determination apparatus in the second example embodiment of the present disclosure.

Further, FIG. 14 shows an example of a hardware configuration of the determination apparatus 800. Referring to FIG. 14, the determination apparatus 800 has, as an example, a hardware configuration as shown below including;

a CPU (Central Processing Unit) 801 (operation device),
a ROM (Read Only Memory) 802 (storage device),
a RAM (Random Access Memory) 803 (storage device),
programs 804 loaded to the RAM 803,
a storage device 805 for storing the programs 804,
a drive device 806 reading from and writing into a recording medium 810 outside the information processing apparatus,
a communication interface 807 connected to a communication network 811 outside the information processing apparatus,
an input/output interface 808 performing input and output of data, and
a bus 809 connecting the respective components.

Figure 15:
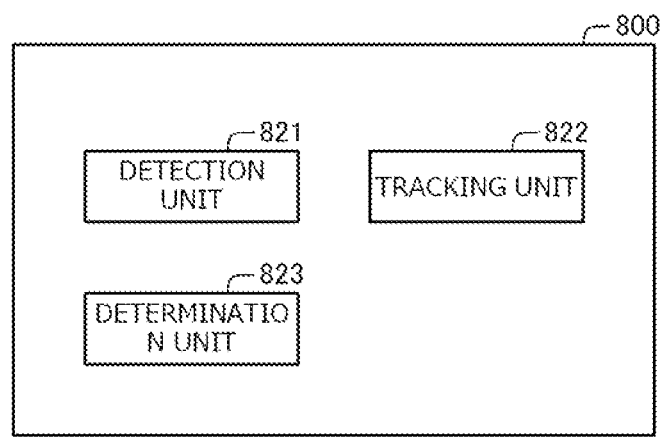
FIG. 15 is a block diagram showing an example of a configuration of the determination apparatus in the second example embodiment of the present disclosure.

Further, by acquisition and execution of the programs 804 by the CPU 801, the determination apparatus 800 can implement the functions of a detection unit 821, a tracking unit 822, and a determination unit 823 shown in FIG. 15. The programs 804 are, for example, stored in the storage device or the ROM 805 in advance, and are loaded to the RAM 803 or the like and executed by the CPU 801 as necessary. Moreover, the programs 804 may be supplied to the CPU 801 via the communication network 811, or may be stored in the recording medium 810 in advance and retrieved and supplied to the CPU 801 by the drive device 806.

FIG. 14 shows an example of the hardware configuration of the determination apparatus 800. The hardware configuration of the determination apparatus 800 is not limited to that described above. For example, the determination apparatus 800 may be configured by part of the above configuration, for example, excluding the drive device 806.

The detection unit 821 detects an object based on image data showing liquid filled in a container and a marker moving in conjunction with movement of the container.

The tracking unit 822 tracks the object detected by the detection unit 821.

The determination unit 823 determines the object detected by the detection unit 821 based on the result of the tracking by the tracking unit 822 and the movement of the marker. For example, the determination unit 823 determines whether the object is foreign matter, an air bubble, or a scratch or the like on the container.

Thus, the determination apparatus 800 includes the detection unit 821, the tracking unit 822, and the determination unit 823. With such a configuration, the determination unit 823 can perform determination of an object detected by the detection unit 821 based on the result of tracking by the tracking unit 822 and the movement of the marker. As a result, it becomes possible to easily determine a scratch or the like on a container, and it becomes possible to determine whether the object is an air bubble or foreign matter in a state where the scratch or the like on the container is excluded. Consequently, for example, it becomes possible to increase the accuracy of the determination.

The determination apparatus 800 described above can be implemented by installation of a predetermined program in the determination apparatus 800. Specifically, a program as another aspect of the present invention is a program for causing the determination apparatus 800 to implement: the detection unit 821 that detects an object based on image data showing liquid filled in a container and a marker moving in conjunction with movement of the container; the tracking unit 822 that tracks the object detected by the detection unit 821; and the determination unit 823 that performs determination of the object based on the result of the tracking by the tracking unit 822 and the movement of the marker.

Further, a determination method executed by the determination apparatus 800 described above is a method including, by the determination apparatus 800: detecting an object based on image data showing liquid filled in a container and a marker moving in conjunction with movement of the container; tracking the detected object; and performing determination of the detected object based on the result of the tracking and the movement of the marker.

Since the invention of the program or the determination method having the above configuration also has the same action and effect as the determination apparatus 800, the abovementioned object of the present invention can be achieved.

<Supplementary Notes>

The whole or part of the example embodiments disclosed above can be described as the following supplementary notes. Below, the overview of a grasping device, a determination apparatus and others according to the present invention will be described. However, the present invention is not limited to the following configurations.

(Supplementary Note 1)
A grasping device comprising:
a grasping unit configured to grasp a container filled with liquid;
a tilting unit configured to at least tilt the container in a state where the grasping unit grasps the container; and
a maker installed at a part tilting in synchronism with the container when the container tilts and configured to move in conjunction with movement of the container.

(Supplementary Note 2)
The grasping device according to Supplementary Note 1, wherein:
the grasping unit has a light source emitting light to the liquid filled in the container grasped by the grasping unit;
the light source is installed so as to tilt in synchronism with the container when the container tilts; and
the marker is installed on the light source.

(Supplementary Note 3)
The grasping device according to Supplementary Note 1 or 2, wherein:
the grasping unit is configured to tilt a body unit including the grasping unit to tilt the container grasped by the grasping unit; and
the marker is installed on the body unit.

(Supplementary Note 4)
The grasping device according to any one of Supplementary Notes 1 to 3, wherein
the marker is installed so as to be located within an imaging range in imaging the liquid filled in the container with a camera installed outside.

(Supplementary Note 5)
The grasping device according to any one of Supplementary Notes 1 to 4, wherein
the tilting unit is configured to tilt the container in a clockwise direction and also tilt the container in a counterclockwise direction.

(Supplementary Note 6)
A determination system comprising:
a grasping device including a grasping unit configured to grasp a container filled with liquid, a tilting unit configured to at least tilt the container in a state where the grasping unit grasps the container, and a maker installed at a part tilting in synchronism with the container when the container tilts and configured to move in conjunction with movement of the container;
a camera installed outside the grasping device and configured to image the liquid filled in the container; and
a determination apparatus configured to detect an object based on image data obtained by the camera and determine whether or not the detected object is foreign matter.

(Supplementary Note 7)
A determination apparatus comprising:
a detection unit configured to detect an object based on image data showing liquid filled in a container and a marker moving in conjunction when the container moves;
a tracking unit configured to track the object detected by the detection unit; and
a determination unit configured to perform determination of the object detected by the detection unit based on a result of tracking by the tracking unit and movement of the marker.

(Supplementary Note 8)
The determination apparatus according to Supplementary Note 7, wherein
the determination unit is configured to perform determination of the object based on movement of the object identified as the result of tracking by the tracking unit and the movement of the marker.

(Supplementary Note 9)
The determination apparatus according to Supplementary Note 8, wherein
the determination unit is configured to determine whether the object is an air bubble or foreign matter.

(Supplementary Note 10)
The determination apparatus according to Supplementary Note 8 or 9, wherein
the determination unit is configured to, when the movement of the object and the movement of the marker are in conjunction, determine that the object is a scratch or a strain on the container or adhering matter adhering to the container.

(Supplementary Note 11)
The determination apparatus according to any one of Supplementary Notes 8 to 10, wherein
the determination unit is configured to determine whether or not the movement of the object and the movement of the marker are in conjunction, and also determine whether the object is an air bubble or foreign matter based on the result of tracking by the tracking unit.

(Supplementary Note 12)

The determination apparatus according to any one of Supplementary Notes 8 to 11, wherein
the determination unit is configured to, in accordance with determination based on whether or not the movement of the object and the movement of the marker are in conjunction, identify the object that is a scratch or a stain on the container or adhering matter adhering to the container, and determine whether the object excluding the identified object among the objects detected by the detection unit is an air bubble or foreign matter.

(Supplementary Note 13)

A determination method comprising, by a determination apparatus:
detecting an object based on image data showing liquid filled in a container and a marker moving in conjunction when the container moves;
tracking the detected object; and
performing determination of the detected object based on a result of tracking and movement of the marker.

(Supplementary Note 14)

A non-transitory computer-readable recording medium having a program recorded thereon, the program comprising instructions for causing a determination apparatus to implement:
a detection unit configured to detect an object based on image data showing liquid filled in a container and a marker moving in conjunction when the container moves;
a tracking unit configured to track the object detected by the detection unit; and
a determination unit configured to perform determination of the object based on a result of tracking by the tracking unit and movement of the marker.

The program described in the example embodiments and supplementary notes is stored in a storage device, or recorded on a computer-readable recording medium. For example, the recording medium is a portable medium such as a flexible disk, an optical disk, a magnetooptical disk, and a semiconductor memory.

Although the present invention has been described above with reference to the example embodiments, the present invention is not limited to the above example embodiments. The configurations and details of the present invention can be changed in various manners that can be understood by one skilled in the art within the scope of the present invention.

DESCRIPTION OF REFERENCE NUMERALS 100 determination system
200 grasping device
210 body unit
211 flat portion
212 arm part
213 upper grasping part
214 lower grasping part
220 area light source
230 marker
240 motor
300 camera
400 determination apparatus
410 screen display unit
420 communication IN unit
430 storage unit
431 image information
432 tracking information
433 determination result information
434 program
440 operation processing unit
441 image acquisition unit
442 detection unit
443 tracking unit
444 angle information acquisition unit
445 determination unit
446 output unit
500 container
600 grasping device
610 body unit
611 upper grasping part
612 lower grasping part
613 marker part
620 area light source
630 gear
640 motor
710 grasping unit
720 tilting unit
730 marker
800 determination apparatus
801 CPU
802 ROM
803 RAM
804 programs
805 storage device
806 drive device
807 communication interface
808 input/output interface
809 bus
810 recording medium
811 communication network
821 detection unit
822 tracking unit
823 determination unit

What is claimed is:

1. A grasping device comprising:
a gripper configured to grasp a container filled with liquid;
a motor configured to at least tilt the container in a state where a grasper grasps the container; and
a marker installed at a part tilting in synchronism with the container when the container tilts and configured to move in conjunction with movement of the container, the marker being a structure for enabling acquisition of a rotation angle on a basis of image data in which the container is imaged.

2. The grasping device according to claim 1, wherein:
the grasper has a light source emitting light to the liquid filled in the container grasped by the grasper;
the light source is installed so as to tilt in synchronism with the container when the container tilts; and
the marker is installed on the light source.

3. The grasping device according to claim 1, wherein:
the grasper is configured to tilt a body including the grasper to tilt the container grasped by the grasper; and
the marker is installed on the body.

4. The grasping device according to claim 1, wherein
the marker is installed so as to be located within an imaging range in imaging the liquid filled in the container with a camera installed outside.

5. The grasping device according to claim 1, wherein
the motor is configured to tilt the container in a clockwise direction and also tilt the container in a counterclockwise direction.

6. A determination apparatus comprising:
at least one memory configured to store instructions; and
at least one processor configured to execute the instructions to:
- detect an object based on image data showing liquid filled in a container and a marker moving in conjunction when the container moves;
- track the object; and
- perform determination of the detected object based on a result of tracking and movement of the marker,
wherein the marker enables acquisition of a rotation angle on a basis of the image data in which the container is imaged.

7. The determination apparatus according to claim 6, wherein the at least one processor is configured to execute the instructions to
perform determination of the object based on movement of the object identified as the result of tracking and the movement of the marker.

8. The determination apparatus according to claim 7, wherein the at least one processor is configured to execute the instructions to
determine whether the object is an air bubble or foreign matter.

9. The determination apparatus according to claim 7, wherein the at least one processor is configured to execute the instructions to
when the movement of the object and the movement of the marker are in conjunction, determine that the object is a scratch or a stain on the container or adhering matter adhering to the container.

10. The determination apparatus according to claim 7, wherein the at least one processor is configured to execute the instructions to
determine whether or not the movement of the object and the movement of the marker are in conjunction, and also determine whether the object is an air bubble or foreign matter based on the result of tracking.

11. The determination apparatus according to claim 7, wherein the at least one processor is configured to execute the instructions to
in accordance with determination based on whether or not the movement of the object and the movement of the marker are in conjunction, identify the object that is a scratch or a stain on the container or adhering matter adhering to the container, and determine whether the object excluding the identified object among the objects detected is an air bubble or foreign matter.

12. A determination method comprising, by a determination apparatus:
- detecting an object based on image data showing liquid filled in a container and a marker moving in conjunction when the container moves;
- tracking the detected object; and
- performing determination of the detected object based on a result of tracking and movement of the marker,
wherein the marker enables acquisition of a rotation angle on a basis of the image data in which the container is imaged.

* * * * *